(12) United States Patent
Thubert et al.

(10) Patent No.: US 7,902,973 B2
(45) Date of Patent: Mar. 8, 2011

(54) ALARM REORDERING TO HANDLE ALARM STORMS IN LARGE NETWORKS

(75) Inventors: Pascal Thubert, La Colle sur Loup (FR); Jean-Philippe Vasseur, Saint Martin d'Uriage (FR); Patrick Wetterwald, Mouans Sartoux (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 12/272,476

(22) Filed: Nov. 17, 2008

(65) Prior Publication Data
US 2010/0123572 A1   May 20, 2010

(51) Int. Cl.
*G08B 29/00* (2006.01)
(52) U.S. Cl. ......... 340/506; 340/521; 340/522; 340/527; 340/540; 340/541; 370/238; 370/392; 370/395.52; 370/400; 370/401
(58) Field of Classification Search .................. 340/506, 340/521, 522, 527, 540, 541; 370/238, 392, 370/395.52, 400, 401
See application file for complete search history.

(56) References Cited

U.S. PATENT DOCUMENTS

| | | | |
|---|---|---|---|
| 5,717,687 A * | 2/1998 | Minot et al. | 370/257 |
| 6,862,698 B1 | 3/2005 | Shyu | |
| 7,061,860 B1 | 6/2006 | Calvignac et al. | |
| 7,069,325 B1 | 6/2006 | Lu et al. | |
| 7,084,752 B2 | 8/2006 | Parello et al. | |
| 7,171,491 B1 | 1/2007 | O'Toole et al. | |
| 7,301,895 B2 | 11/2007 | Saleh et al. | |
| 7,392,279 B1 | 6/2008 | Chandran et al. | |
| 7,403,501 B2 | 7/2008 | Bordonaro et al. | |
| 2007/0140262 A1 * | 6/2007 | Wang | 370/395.52 |
| 2007/0206547 A1 | 9/2007 | Gong et al. | |
| 2007/0207771 A1 | 9/2007 | Bowser et al. | |

* cited by examiner

*Primary Examiner* — Tai T Nguyen
(74) *Attorney, Agent, or Firm* — Cesari and McKenna, LLP

(57) ABSTRACT

In one embodiment, one or more routing trees may be determined based on corresponding root nodes to reach a particular receiving node in a computer network. A delay value may be calculated at each node of the routing tree, the delay value inversely proportional to a distance between each respective node and the root node of the tree. Upon detecting a trigger at a particular node of the tree to transmit a stormed message to the particular receiving node (e.g., an alarm), the particular node may initiate a timer to count down the delay value in order to receive any upstream node stormed messages prior to expiration of the timer. The particular node may then coalesce the upstream node stormed messages with the stormed message of the particular node, and may transmit the coalesced stormed message downstream along the tree toward the particular receiving node upon expiration of the timer.

19 Claims, 6 Drawing Sheets

US 7,902,973 B2

ALARM REORDERING TO HANDLE ALARM STORMS IN LARGE NETWORKS

TECHNICAL FIELD

The present disclosure relates generally to computer networks, and, more particularly, to sensor networks.

BACKGROUND

Sensor networks are commonly made of a very large number of nodes. In fact, for certain sensor networks, such as advanced metering infrastructure (AMI) networks, it is not uncommon to have tens of millions of meters with sensors. AMI network sensors may, for example, sense power levels, power consumption, and certain alarm triggering events (e.g., power loss/blackouts, brownouts, or spikes, etc.). Often, the devices having attached sensors (e.g., meters) are arranged in groups, where N devices would be affected by the same events, such as being connected to the same centralized links (e.g., a distribution power cable), being in a same location (e.g., for fire detection), etc. When such an event occurs, (e.g., one of these links/cables fail), a subset M of the devices are likely to be affected. Such failure triggers the generation of a set of alarms (an alarm storm) by the sensor network, leading to highly congested networks (wired/wireless) where alarms may be lost, or delayed (at best).

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
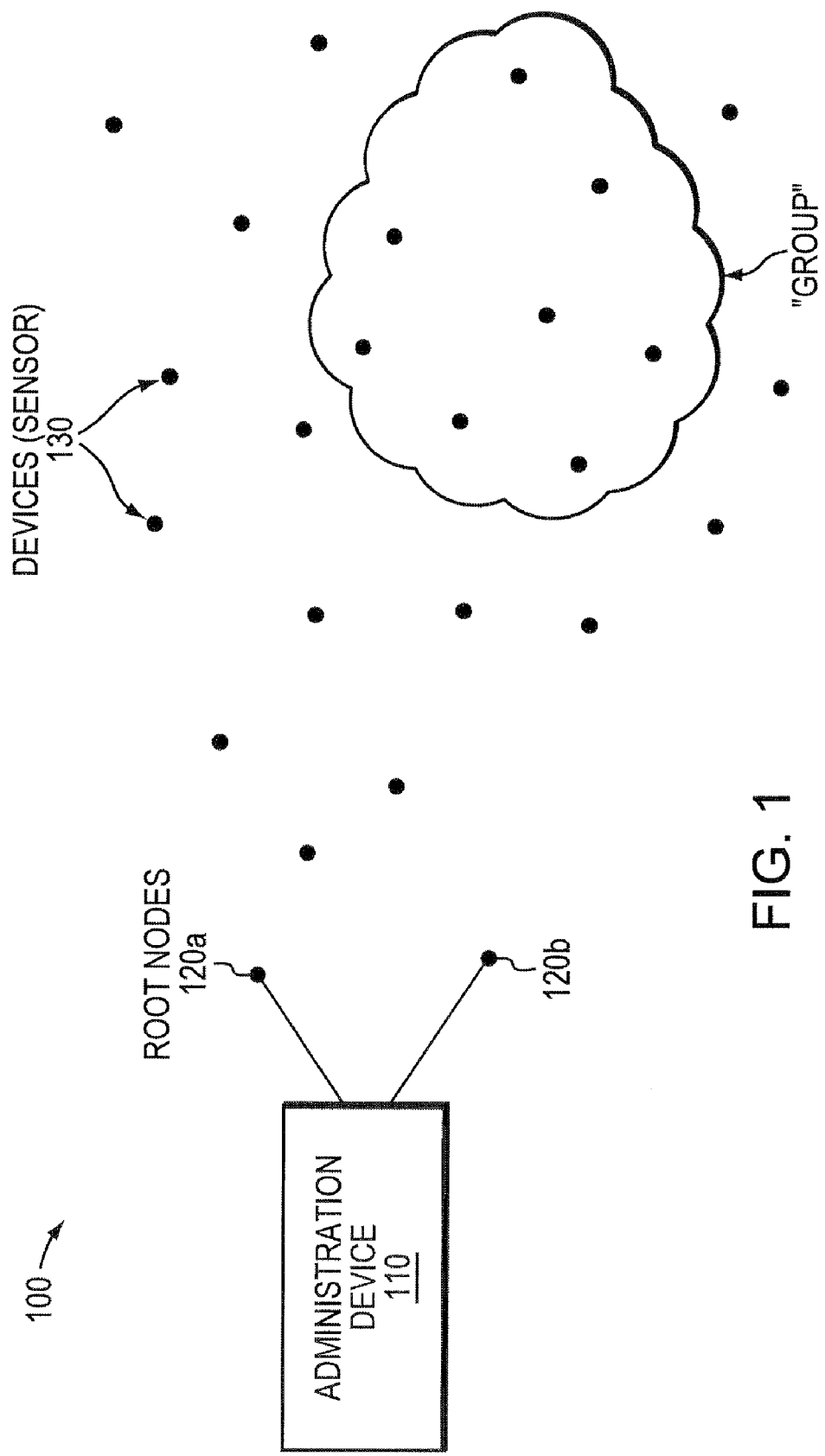
FIG. 1 illustrates an example computer/sensor network.

According to embodiments of the disclosure, one or more routing trees may be determined based on corresponding root nodes to reach a particular receiving node in a computer network. A delay value may be calculated at each node of the routing tree, the delay value inversely proportional to a distance between each respective node and the root node of the tree. Upon detecting a trigger at a particular node of the tree to transmit a stormed message to the particular receiving node (e.g., an alarm), the particular node may initiate a timer to count down the delay value in order to receive any upstream node stormed messages prior to expiration of the timer. The particular node may then coalesce the upstream node stormed messages with the stormed message of the particular node, and may transmit the coalesced stormed message downstream along the tree toward the particular receiving node upon expiration of the timer.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Sensor networks, in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Sensor networks are typically wireless networks, though wired connections are also available. That is, in addition to one or more sensors, each sensor device (node) in a sensor network may generally be equipped with a radio transceiver or other communication port, a small microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

Typically, the sensors in a sensor network transmit their data to one or more centralized database management nodes, or "sensor sinks" that obtain the data for use with one or more associated applications. In a "push mode," the sensors transmit their data to the sensor sink without prompting, e.g., at a regular interval or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network, or, more particularly, a sensor network 100, illustratively comprising nodes/devices, such as one or more devices 130 (e.g., sensors) and an administration device 110 (e.g., a sensor sink) interconnected by links (not generally shown for clarity). Also, as described further herein, one or more of the devices 130 close to the administration device 110 may be considered "root nodes." Those skilled in the art will understand that any number of nodes, devices, links, etc. may be used in the computer network, and that the view shown herein is for simplicity. The links (not shown) may be wired links for electronic and/or optical transmissions, or may comprise a wireless communication medium, as will be appreciated by those skilled in the art (such as for wireless ad-hoc networks), where certain nodes 130 may be in communication with other nodes 130, e.g., based on distance, signal strength, current operational status, location, etc., or in direct communication with the administration node (e.g., sensor sink) 110.

Data packets (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, Multi-Protocol Label Switching (MPLS), various proprietary protocols, etc. In this context, a protocol consists of a set of rules defining how the nodes interact with each other.

Figure 2:
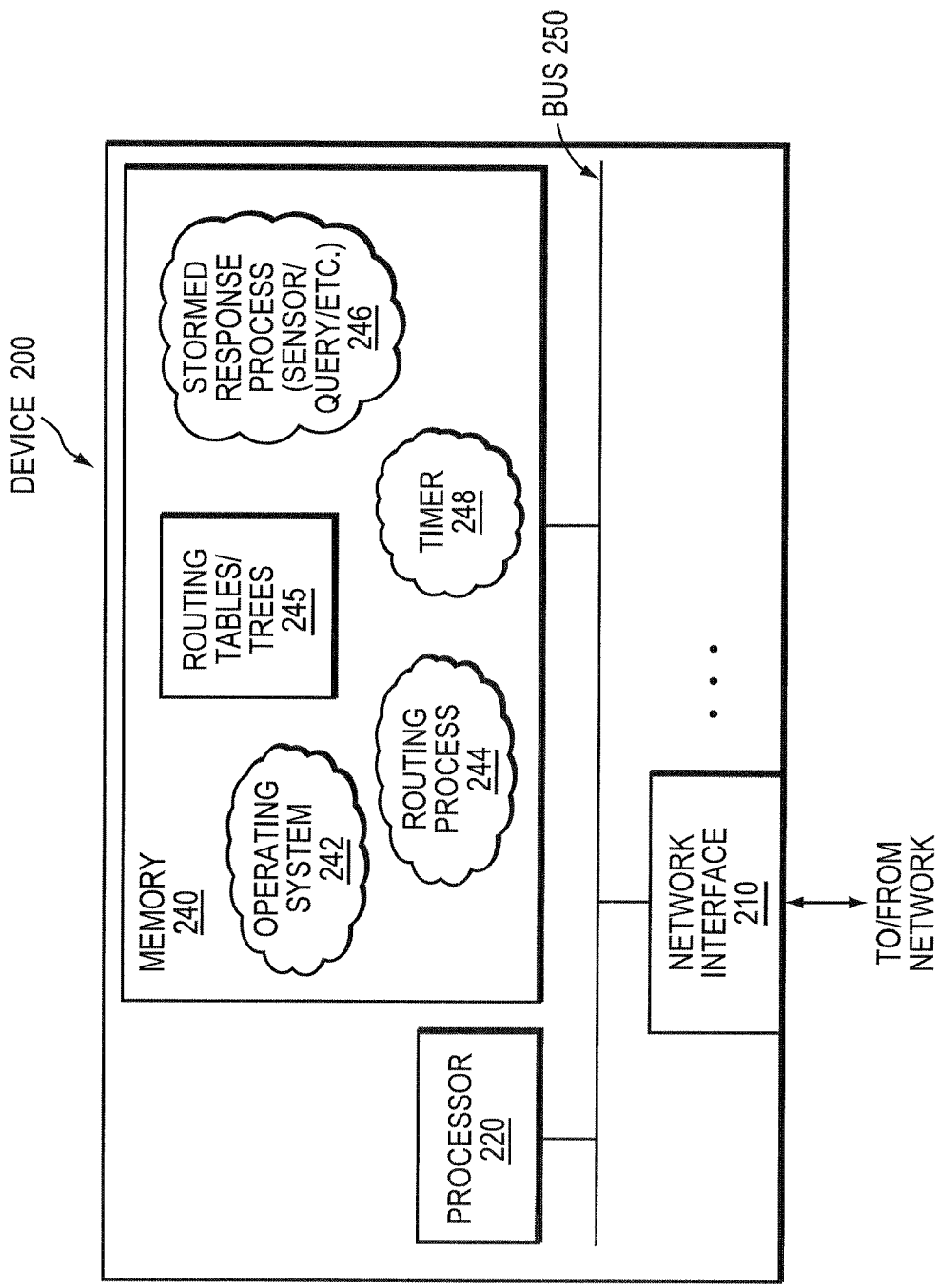
FIG. 2 illustrates an example device.

FIG. 2 is a schematic block diagram of an example node/device 200 that may be advantageously used with one or more embodiments described herein, e.g., as a device or sensor 130. The device comprises one or more network interfaces 210, a processor 220 (e.g., an 8-64 bit microcontroller), and a memory 240 interconnected by a system bus 250. The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, ATM, wireless protocols (e.g., IEEE Std. 802.14.5, WiFi, Bluetooth®), Frame Relay, Ethernet, powerline converter (PLC) protocols, etc.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures, such as routing trees/tables 245. An operating system 242, portions of which are typically resident in memory 240 and executed by the processor, functionally organizes the device by, inter alia, invoking operations in support of software processes and/or services executing on the device. These software processes and/or services may comprise, as described herein, a routing process 244, a "stormed response process" 246, and a timer 248. It will be apparent to those skilled in the art that other processor and memory types, including various computer-readable media, may be used to store and execute program instructions pertaining to the inventive techniques described herein.

Routing process (services) 244 contains computer executable instructions executed by the processor 220 to perform functions provided by one or more routing protocols, such as proactive or reactive routing protocols as will be understood by those skilled in the art. These functions may be configured to manage a routing table/tree 245 containing, e.g., data used to make routing decisions. In particular, in proactive routing, connectivity is discovered and known prior to computing routes to any destination in the network (e.g., Optimized Link State Routing, "OLSR"). Reactive routing, on the other hand, discovers neighbors (i.e., does not have an a priori knowledge of network topology), and in response to a needed route to a destination, sends a route request into the network to determine which neighboring node may be used to reach the desired destination. Illustrative reactive routing protocols may comprise, inter alia, Ad-hoc On-demand Distance Vector (AODV), Dynamic Source Routing (DSR), DYnamic MANET On-demand Routing (DYMO), etc. Generally, reactive routing protocols may be used to reduce storage and processing requirements on the nodes 130 (e.g., small, distributed, low-power devices, such as sensors), and to limit the number of updates to stored topologies due to the ad-hoc changing nature of the network (e.g., MANETs).

As noted above, sensor networks are commonly made of a very large number of nodes. For example, assume that the network 100 in FIG. 1 is an advanced metering infrastructure (AMI) network. Each device/sensor 130 may thus be a "smart meter," and the network may have tens of millions of devices. As mentioned, AMI network sensors may, detect various alarm triggering events, such as power loss/blackouts, brownouts, or power spikes. For instance, the devices 130 may be arranged in groups (denoted as the cloud in FIG. 1), where N devices would be affected by the same events, such as being connected to a same distribution power cable. When such an event occurs, such as the cable failing, a subset M of the devices are likely to be affected. Such failure triggers the generation of a set of alarms (an alarm "storm") by the sensor network, leading to highly congested networks (wired/wireless) where alarms may be lost, or delayed (at best). Other types of message storms, such as timed responses or responses to network-wide queries may also generate message storms.

Notably, a message or alarm storm, as used herein, is a large number of messages being generated in a substantially short period of time, e.g., in response to a same event, where each of the messages may be sent to a same destination, such as a sensor sink, administration device 110, or other collection device. As such, message storms may also be associated with "fan-in" problems, where the large number of devices 130 reporting to the same destination creates greater and greater congestion in the network as the messages reach combining devices where multiple paths converge into a single link/path (in other words, fan-in applies where a node takes messages from many paths and transmits them on one toward the destination). For example, assume that of the tens of millions of smart meters in the network 100, an event occurs that triggers alarms on one million devices 130. All of the one million devices will conventionally generate an alarm message, and transmits the alarm to the administration device 110. As the million messages get closer to the administration device 110, the network becomes more and more congested due to the network fan-in. Also, in the end, the million messages merely report the same event.

Handling Message/Alarm Storms

According to embodiments of the disclosure, therefore, upon detecting an alarm condition, a sensor device 130 may wait for a delay that is inversely proportional to a distance between the sensor device and a destination device (e.g., administration device 110) to receive alarm messages. While waiting for the delay, each sensor device may receive one or more alarm messages from upstream sensor devices. (Note that "upstream" herein implies that the sensor device is between the upstream devices and the downstream destination device to which the alarm is being transmitted, thus based on the message flow; those skilled in the art may alternatively refer to "upstream" and "downstream" based on tree construction, and if so, they should be aware that the terms "upstream" and "downstream" refer to the direction of message flow, as noted.) Accordingly, each sensor device may coalesce the received alarm messages with an alarm message that is to be generated by the sensor device itself. The sensor device 130 may then transmit the coalesced alarm message downstream toward the destination device after the delay.

In other words, the techniques herein give the devices 130 in the network a delay value such that the device furthest away from the destination has the least delay, while those closest have the longest delay. In this manner, the furthest device sends its message first, prior to the second-furthest away device, which, as such, may aggregate the two messages on their way to the destination into a single message (e.g., having the same or similar content, as described below). This accordingly reduces traffic in the network (e.g., for wireless congestion), and limits occurrence of duplicate messages. (Notably, the techniques herein may be applied more broadly than simply to alarm messages, as described below.)

Illustratively, the techniques described herein may be performed by hardware, software, and/or firmware, such as in accordance with a "stormed response" process 246, which may contain computer executable instructions executed by the processor 220 to perform functions relating to sensor network operation as may be appreciated by those skilled in the art, and particularly additional functions relating to the novel "stormed message" handling techniques described herein.

Figure 3:
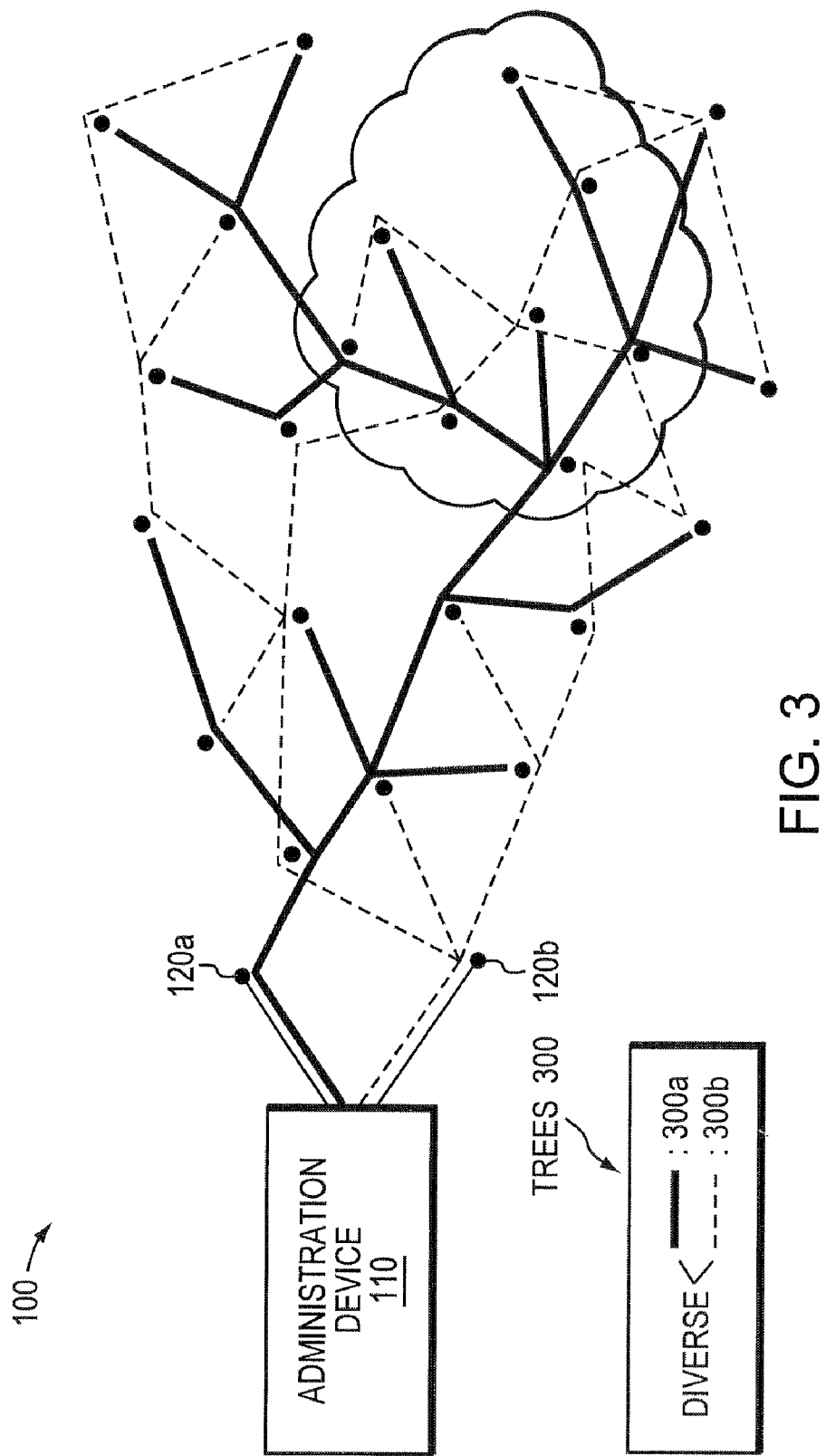
FIG. 3 illustrates an example routing tree.

Operationally, a first component of the techniques herein consists of building one or more diversely routed trees (paths) that may be used to organize the sending and coalescence of messages/alarms between senders (to avoid a large set of unordered alarms sent in a broadcast storm). FIG. 3 illustrates an example tree set 300, having diverse routing trees 300a (solid, "T1") and 300b (dashed, "T2") as shown, created from the illustrative devices in network 100. The purpose for having a plurality of diversely routed trees is for redundancy to reduce the chance that the destination device is completely unreachable due to a single failure, as may be appreciated by those skilled in the art.

Specifically, each device/node 130 may determine a routing tree based on a root node 120 to reach a particular receiving node (e.g., administration node 110) in a computer network. Prior to any messages/alarms are sent, a root election operation may be performed by each device 130 to elect the corresponding root nodes 120 of each tree (e.g., two or more root nodes for diverse trees), for example, 120a for tree T1 (300a) and 120b for tree T2 (300b). Root election may be based on, e.g., wireless signal strength between other roots (e.g., the lower the better, implying in certain circumstances that a wireless root node is further away from other root nodes), policy, manual configuration, history, etc. The elected roots are generally not the destination device, since the roots generally do not perform the operation/application that processes the data/alarms. However, it is important to elect roots to have diverse trees (though not as important for a single tree), since diverse trees benefit from having a set of diverse root nodes adjacent to (or very near) the destination device, as may be appreciated by those skilled in the art. Thus, the elected roots should be distanced from each other in order to provide a better chance of having diverse paths not affected by a same failure/incident.

Once the roots are elected, the diverse trees may be formed, e.g., T1 and T2 as shown, such that each node is both attached to both T1 and T2. Notably, the tree or trees may be determined at a centralized location and distributed to each of the devices/nodes 130 in the network, or the tree(s) may be locally determined (a "distributed" computation) using a same computational algorithm (e.g., a same routing protocol/process 244 and the same root election process).

Having computed the routing tree 300 (or diverse trees 300a and 300b), each device 130 may then calculate a delay value that is inversely proportional to a distance between the respective node/device and the root node 120 of the particular tree. In other words, the further away from the root node (e.g., in propagation time, hops, etc.), the shorter the delay, while the closer the device is to the root node, the longer the delay. In general, one purpose of the delay is to ensure that a node has been given the opportunity to receive any upstream node messages before sending its own message downstream toward the destination, as described in more detail below. Note that each tree may have its own delay value, e.g., "d1" for T1, and "d2" for T2, as each node may have a different distance to the destination per tree.

With the determined trees and computed delays, the devices 130 may perform their duties in a conventional manner until a trigger is detected at a particular node to transmit a "stormed message" to a particular receiving node (e.g., to the administration device 110). Notably, as used herein, a stormed message is a message that may generally be considered to be associated with a broadcast fan-in storm, such as where a large number of messages may be generated in a short period of time response to certain events, such as failures, alarm conditions, network-wide queries, etc. As such, a trigger to transmit a stormed message may be any configured event known to cause message storms.

Figure 4:
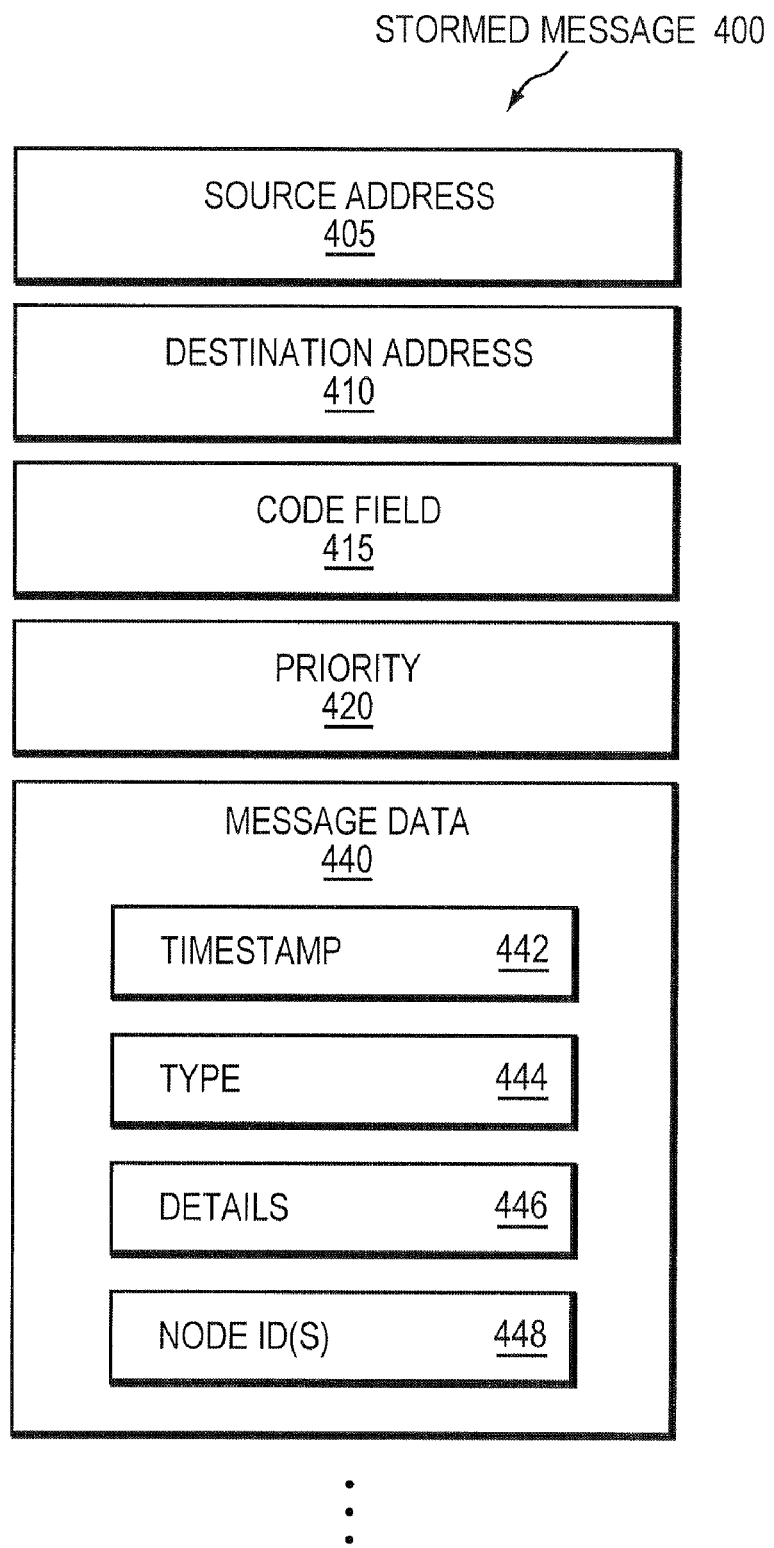
FIG. 4 illustrates an example message.

FIG. 4 illustrates an example stormed message 400 that may be used in accordance with the embodiments described herein. In particular, message 400 may comprise one or more fields, such as a source address field 405 and destination address field 410 as will be understood by those skilled in the art, along with a code field 415 identifying the type of message (e.g., an alarm, a query response, etc.) and a priority field 420 as will also be understood. Further, message data field 440 may comprise a plurality of sub-fields, suitable for the particular type of message being transmitted. For example, an illustrative configuration as described herein may comprise a timestamp field 442, a type field 444 (to describe the specific type of alarm, such as a "power outage" or "brownout", etc.), a details field (e.g., to provide additional details, such as "current power level: X", etc.), and a Node identifier (ID) field 448 to carry the ID of the reporting node. (Those skilled in the art will appreciate that these fields are merely representative, and are not meant to limit the scope of the embodiments described herein.)

Upon detection of the triggering event, a message 400 may be generated by the detecting device 130. The message 400 may have a timestamp value 442 inserted therein to indicate the time of the event, and the device 130 may initiate a timer 248 to count down the delay value calculated above. After the expiration of the timer, the message 400 may be transmitted downstream along the trees 300 (e.g., both T1 and T2) for stormed message processing toward the destination. Illustratively, the messages sent along T1 and T2 may be marked as high priority (for Quality of Service, "QoS"), as may be appreciated by those skilled in the art. (Note that a jitter may be added to the delay value to avoid collision of messages in the network from devices at equal distances from the destination device.)

As the stormed messages (e.g., alarms) 400 are processed at each node along the trees, each branch (converging) node may perform message coalescence. In particular, prior to expiration of a corresponding timer, each device 130 of the network affected by the triggering event may receive upstream node stormed messages generated in response to the same event. The particular node in question may then coalesce the upstream node stormed messages with the stormed message generated by the particular node.

Figure 5:
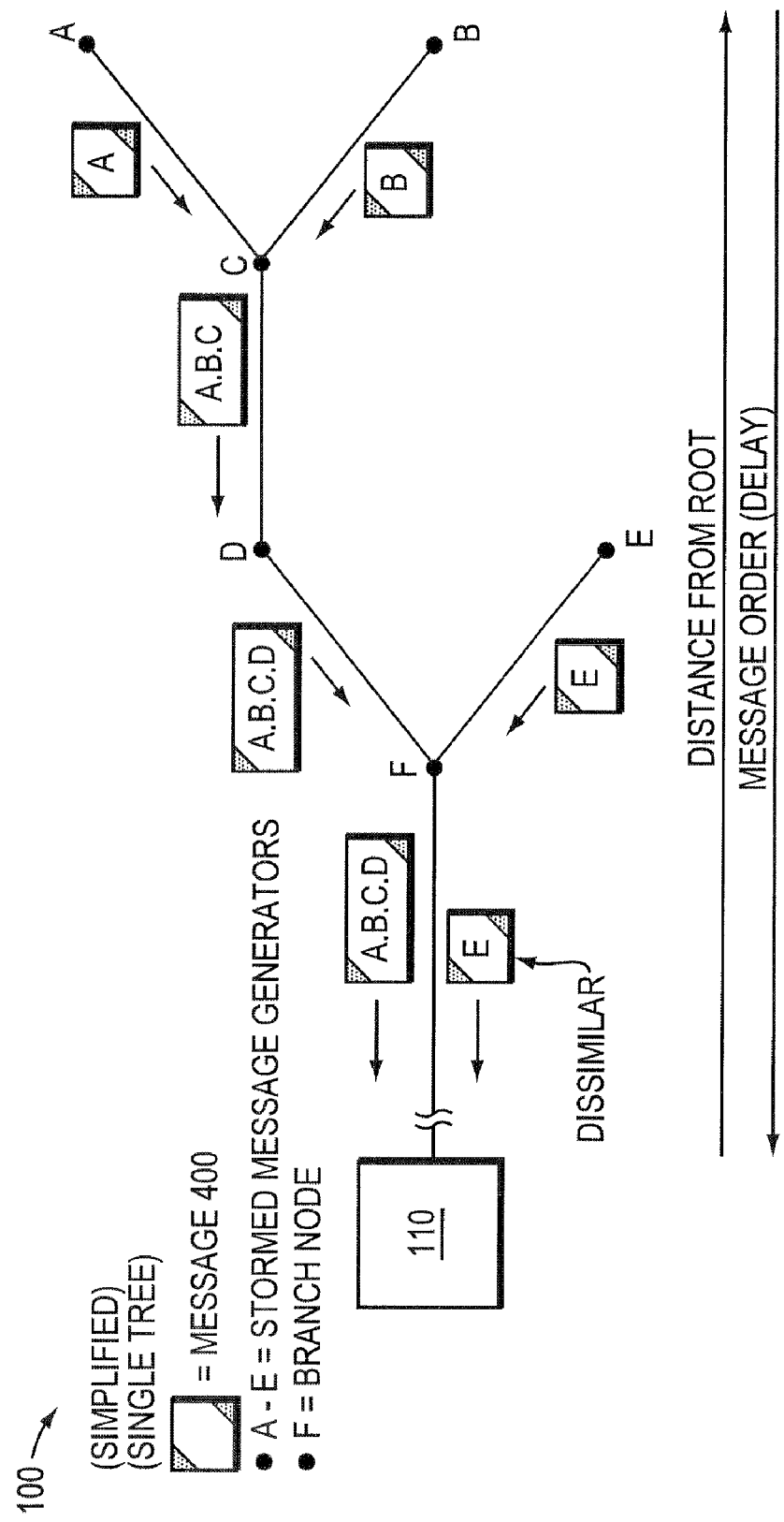
FIG. 5 illustrates an example network showing message propagation.

For instance, FIG. 5 illustrates an example propagation of stormed messages in the network 100 in accordance with one or more embodiments herein (vastly simplified, and only showing a single example tree). Where stormed messages are similar in nature, coalescence may advantageously reduce network congestion. For example, assume that the group of affected devices 130 detect a power outage, and wish to report this alarm condition to the administration device 110. Each device 130 may generate its own stormed message 400, but those furthest away transmit their messages first. Once the next-closest devices receive the first set of stormed messages, these next-closest devices may coalesce the received messages and their own messages by first correlating similar messages from upstream nodes to its own message (and to each other where message fan-in occurs), and then handling the messages appropriately. In particular, based on the nature of the message (e.g., code 415, type 444), time of occurrence (e.g., timestamp 442), other attributes (e.g., details), etc., similar stormed messages may be concatenated into a single coalesced stormed message at the receiving device/node.

In other words, the receiving device may take any received stormed messages and its own stormed message, and may combine them into a single stormed message that effectively transmits the same information as the separate stormed messages would have transmitted. For example, assume that the alarm is reported first from two nodes having Node IDs "A" and "B", whose messages 400 are received by a Node "C". If the timestamp of the event, the type of event, and the details of the event are all the same (i.e., correspond to the same event), then Node C may simply add the Node IDs "A" and "B" to its Node ID field 448, and transmit the message with the same timestamp, type, and details of the event, along with the indication that nodes A-C reported the event (so the extra repeated data and message headers associated with the messages from A and B have been eliminated). Similarly, node "D" may add its node ID to the message, and node "F" may simply forward the message, as it has no message to generate itself (i.e., it was not in the group of affected nodes 130).

Other concatenation techniques may be used as appropriate to combine stormed messages, such as providing a plurality of message data fields 440, where each field 440 corresponds to a different type of message (e.g., some devices may detect a blackout, others may detect a brownout, etc., but all involve the same "event" at roughly the same time). In this manner, concatenation may simply merge all of the stormed messages into a single message having a single header, which may be longer than a conventional message, but alleviates the overhead involved with processing a large number of messages, as may be appreciated by those skilled in the art. Alternatively, dissimilar stormed messages may be transmitted separately (e.g., at node "F" from node "E"), such as different types of messages, even though the messages may be generated at the same time in response to the same event (e.g., power outage may generate a power outage alarm, as well as a battery life outage alarm for devices with little or no remaining battery life, which may beneficially be kept separate).

Moreover, since stormed messages, particularly alarms, may often be duplicated, a branch node may performs duplicate suppression, where if two identical alarms are detected, the second one is suppressed. In other words, a first event may trigger a first storm of messages, but subsequent messages may also be generated, such as where the event is still being detected (e.g., the power is still out). Accordingly, upon determining that an upstream node has sent a stormed message that is reporting the same content as a previous stormed message, then the content may be suppressed from either a coalesced stormed message, or from any message being transmitted downstream. (Note that any specific content from a duplicate stormed message may be maintained within a coalesced stormed message, such as a Node ID, to indicate specific information about duplicate messages, without the need to duplicate the messages.)

When the messages 400 reach the operator (administration device 110), there is a full list of all impacted devices (e.g., subscribers) that can be mapped within the network to estimate the location of the alarm condition. (Alternatively, there is a full list of all responses from queried devices, etc.) Notably, not all network devices 130 need be configured to perform the message storm handling techniques described herein. For instance, certain more capable devices may coalesce messages, while lesser capable devices may simply forward received messages and generate their own messages in response to events. Downstream devices may thus be configured to coalesce all of the messages accordingly.

Also, where a device 130 is not part of the group of devices affected by the event, such devices need not be concerned with delay timers, etc., as such devices are not generating their own stormed message. That is, the non-affected devices may simply forward the stormed messages in a conventional manner toward the destination. Note, however, that certain devices immediately outside of the group of affected devices may still experience a certain fan-in of stormed messages, and may still be configured to coalesce the responses prior to transmitting them further (i.e., a delay is not needed, as the device is only aware of the event after receiving the stormed messages from the affected group devices).

Figure 6:
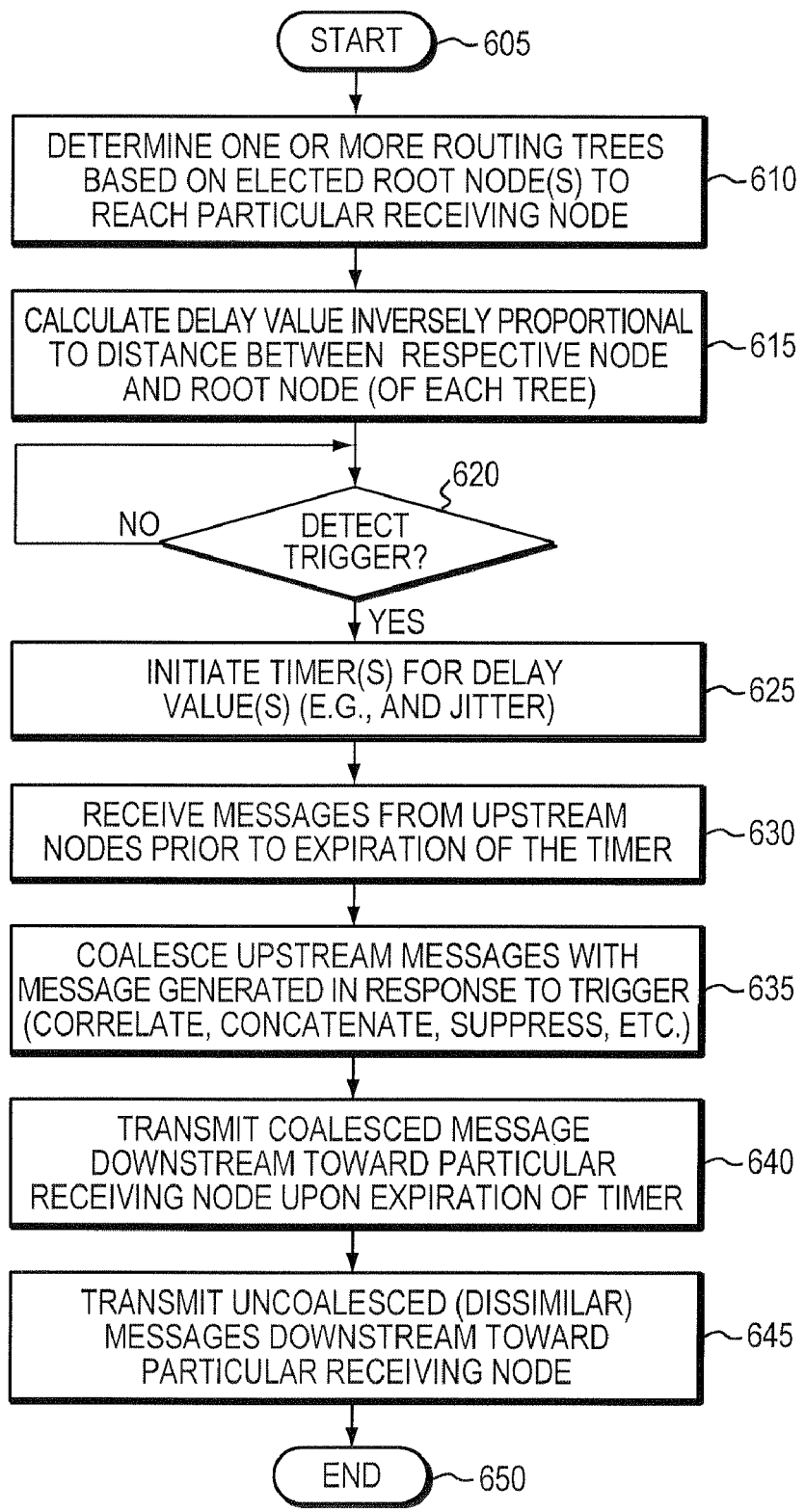
FIG. 6 illustrates an example procedure for handling message/alarm storms.

FIG. 6 illustrates an example procedure for handling message storms (e.g., alarm storms) in accordance with one or more embodiments described herein. The procedure 600 starts at step 605, and continues to step 610, where one or more routing trees 300 may be determined based on elected root node(s) 120 to reach particular receiving node (e.g., administration device 110). Each node 130 of the tree (that is, of the network) may then calculate its corresponding delay value that is inversely proportional to distance between the respective node and root node (of each tree) in step 615.

In response to detecting a trigger in step 620, as described above, a node may initiate a timer for each tree in step 625 based on the calculated delay value (e.g., and additional jitter). During the count down of the timer, in step 630 the node may receive messages from upstream nodes, and may correspondingly coalesce the upstream messages in step 635 with the message to be generated in response to the trigger. That is, the node may correlate messages, concatenate messages/content, suppress messages/content, etc., as described more fully above.

In step 640, the coalesced message may be transmitted downstream toward the particular receiving node upon expiration of the timer, possibly being further coalesced by downstream nodes. Also, in step 645 (optionally), uncoalesced messages may be transmitted downstream toward the particular receiving node, such as where the messages are dissimilar in type, content, etc., as mentioned above. The procedure 600 ends in step 650, notably where each node of the tree detecting the triggering event has participated in handling the message storm in accordance with the embodiments described herein.

Advantageously, the novel techniques described herein construct and utilize alarm trees to avoid alarm storms in a sensor network. By using alarm trees with time-delayed alarms (or other messages) based on the distance from each device to the root/destination, the novel techniques reduce congestion in an alarm storm. In particular, by aggregating the alarm messages along the alarm trees (if the messages are the same or similar in nature, type, etc.), the techniques described above further reduce the number of messages in the network as a result of the alarm storm, further alleviating congestion. Also, the dynamic aspects of one or more embodiments described herein alleviate the need for cumbersome and inefficient manual configuration.

While there have been shown and described illustrative embodiments that handle alarm storms in a sensor network, it is to be understood that various other adaptations and modifications may be made within the spirit and scope of the present invention. For example, the embodiments have been shown and described herein for use with meters and AMI networks. However, the embodiments of the invention in their broader sense are not so limited, and may, in fact, be used with any similarly arranged network configured with alarm generating devices, such as sensors. To that effect, the embodiments herein need not be limited to sensor networks, but may be used with any type of network having devices that generate a storm of messages that fan-in to a centralized receiving location.

Moreover, the techniques described above reference alarm storms in particular, although the embodiments herein may be advantageously used with any type of stormed message, such as reports/replies in response to a network-wide (distributed) query from the administration device. In other words, the stormed message may be a response to a network-wide query, where the triggering event is receipt of the query at a particular network device.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   determining a routing tree based on a root node to reach a particular receiving node in a computer network;
   calculating a delay value at each node of the routing tree, the delay value inversely proportional to a distance between each respective node and the root node of the tree;
   detecting a trigger at a particular node of the tree to transmit a stormed message to the particular receiving node; and
   in response, at the particular node:
      initiating a timer to count down the delay value;
      receiving all upstream node stormed messages prior to expiration of the timer;
      coalescing the upstream node stormed messages with the stormed message of the particular node; and
      transmitting the coalesced stormed message downstream along the tree toward the particular receiving node upon expiration of the timer.

2. The method as in claim 1, wherein coalescing further comprises:
   correlating similar upstream node stormed messages and the stormed message of the particular node; and
   concatenating the similar stormed messages into a single coalesced stormed message of the particular node.

3. The method as in claim 2, further comprising:
   transmitting dissimilar stormed messages from upstream nodes downstream along the tree toward the particular receiving node.

4. The method as in claim 2, further comprising:
   determining that an upstream node stormed message is reporting the same content as a previous upstream node stormed message; and, in response,
   suppressing the same content from the coalesced stormed message.

5. The method as in claim 4, further comprising:
   maintaining any specific content from upstream node stormed messages within the coalesced stormed message.

6. The method as in claim 1, further comprising:
   determining a plurality of diverse routing trees based on a plurality of corresponding root nodes to reach the particular receiving node;
   calculating the delay value at each node for each routing tree; and
   in response to detecting the trigger:
      initiating the timer, receiving all upstream node stormed messages, coalescing the upstream node stormed messages, and transmitting the coalesced stormed message for each of the plurality of routing trees.

7. The method as in claim 6, further comprising:
   electing the corresponding root nodes of each of the diverse trees.

8. The method as in claim 7, wherein root election is based on a factor selected from a group consisting of: wireless signal strength between root nodes, policy, manual configuration, and history.

9. The method as in claim 6, further comprising:
   determining the diverse trees at a centralized location; and
   distributing the diverse trees to each of the nodes of the network.

10. The method as in claim 6, wherein each of the nodes of the network locally determines the diverse trees using a same computational algorithm.

11. The method as in claim 1, wherein the stormed message is an alarm message.

12. The method as in claim 11, wherein the trigger is an event triggering an alarm condition.

13. The method as in claim 1, wherein the stormed message is a response to a network-wide query, and the trigger is receipt of the query.

14. The method as in claim 1, further comprising:
    adding a jitter to the delay value.

15. The method as in claim 1, further comprising:
    inserting a timestamp into the stormed message corresponding to detection of the trigger.

16. The method as in claim 1, wherein the particular receiving node is an administration node.

17. The method as in claim 1, further comprising:
    transmitting stormed messages at a high priority.

18. An apparatus, comprising:
    one or more network interfaces adapted to communicate with nodes in a network;
    a processor coupled to the network interfaces and adapted to execute one or more processes; and
    a memory adapted to store a stormed response process executable by the processor, the stormed response process when executed operable to:
       determine a routing tree based on a root node to reach a particular receiving node;
       calculate a delay value inversely proportional to a distance between the apparatus and the root node of the tree;
       detect a trigger to transmit a stormed message to the particular receiving node; and
       in response:
          initiate a timer to count down the delay value;
          receive all upstream node stormed messages prior to expiration of the timer;
          coalesce the upstream node stormed messages with the stormed message of the apparatus; and transmit the coalesced stormed message downstream along the tree toward the particular receiving node upon expiration of the timer.

19. The apparatus as in claim 18, wherein the stormed response process when executed further operable to:
determine a plurality of diverse routing trees based on a plurality of corresponding root nodes to reach the particular receiving node;
calculate the delay value for each routing tree; and
in response to detecting the trigger:
initiate the timer, receive all upstream node stormed messages, coalesce the upstream node stormed messages, and transmit the coalesced stormed message for each of the plurality of routing trees.

* * * * *